US008122487B2

(12) United States Patent
Lee et al.

(10) Patent No.: US 8,122,487 B2
(45) Date of Patent: Feb. 21, 2012

(54) METHOD AND APPARATUS FOR CHECKING PROXIMITY BETWEEN DEVICES USING HASH CHAIN

(75) Inventors: Jae-heung Lee, Suwon-si (KR); Myung-sun Kim, Uiwang-si (KR); Sung-hyu Han, Seoul (KR); Young-sun Yoon, Suwon-si (KR); Sun-nam Lee, Suwon-si (KR); Bong-seon Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1733 days.

(21) Appl. No.: 11/385,907

(22) Filed: Mar. 22, 2006

(65) Prior Publication Data

US 2006/0248340 A1    Nov. 2, 2006

(30) Foreign Application Priority Data

Apr. 29, 2005 (KR) .................. 10-2005-0036156

(51) Int. Cl.
*G06F 7/04* (2006.01)
*G06F 15/16* (2006.01)
*H04L 9/32* (2006.01)

(52) U.S. Cl. ................... 726/4; 713/181; 713/178
(58) Field of Classification Search ........ 726/4; 713/181, 713/178
See application file for complete search history.

(56) References Cited

U.S. PATENT DOCUMENTS

| 6,460,137 B1 | 10/2002 | Akiyama et al. |
| 6,493,825 B1 | 12/2002 | Blumenau et al. |
| 6,681,099 B1 | 1/2004 | Keranen et al. |
| 7,653,713 B2 * | 1/2010 | Han et al. ............ 709/223 |
| 2002/0120838 A1 * | 8/2002 | Abdulkader ........... 713/153 |
| 2003/0221107 A1 | 11/2003 | Kang |
| 2005/0036616 A1 * | 2/2005 | Huang et al. ........ 380/255 |
| 2005/0259819 A1 * | 11/2005 | Oomen et al. ....... 380/200 |
| 2006/0041642 A1 * | 2/2006 | Rosner et al. ....... 709/220 |
| 2006/0093144 A1 * | 5/2006 | Reinelt ............... 380/258 |
| 2006/0097843 A1 * | 5/2006 | Libin .................. 340/5.28 |

FOREIGN PATENT DOCUMENTS

| CN | 1444833 A | 9/2003 |
| CN | 1459724 A | 12/2003 |
| JP | 2003-124927 A | 4/2003 |
| JP | 2003-143128 A | 5/2003 |
| KR | 1999-0076101 A | 10/1999 |
| KR | 10-2004-0009766 A | 1/2004 |
| WO | WO 96/32791 A1 | 10/1996 |
| WO | 01/89254 A1 | 11/2001 |
| WO | WO 2004/030311 A1 | 4/2004 |
| WO | WO 2005/010770 A1 | 2/2005 |

OTHER PUBLICATIONS

Chinese Office Action dated Aug. 21, 2009.

* cited by examiner

*Primary Examiner* — Kambiz Zand
*Assistant Examiner* — Aubrey Wyszynski
(74) *Attorney, Agent, or Firm* — Sughrue Mion, PLLC

(57) ABSTRACT

A method of measuring round trip time (RTT) includes: chain-hashing at least one random number to create a plurality of hash values; (b) transmitting one of the created hash values to a device and starting to measure RTT of the device; and (c) receiving from the device a response to the transmitted hash value and ending the RTT measurement, thereby performing a more effective proximity check than a conventional proximity check requiring encryptions and decryptions of several tens of times through several thousands of times.

19 Claims, 7 Drawing Sheets

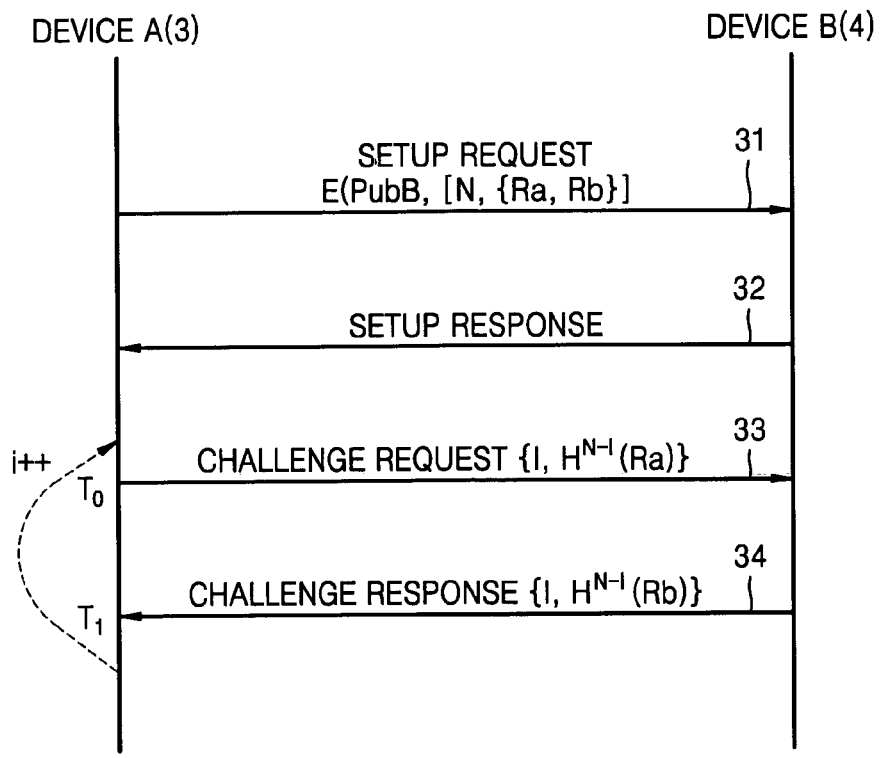
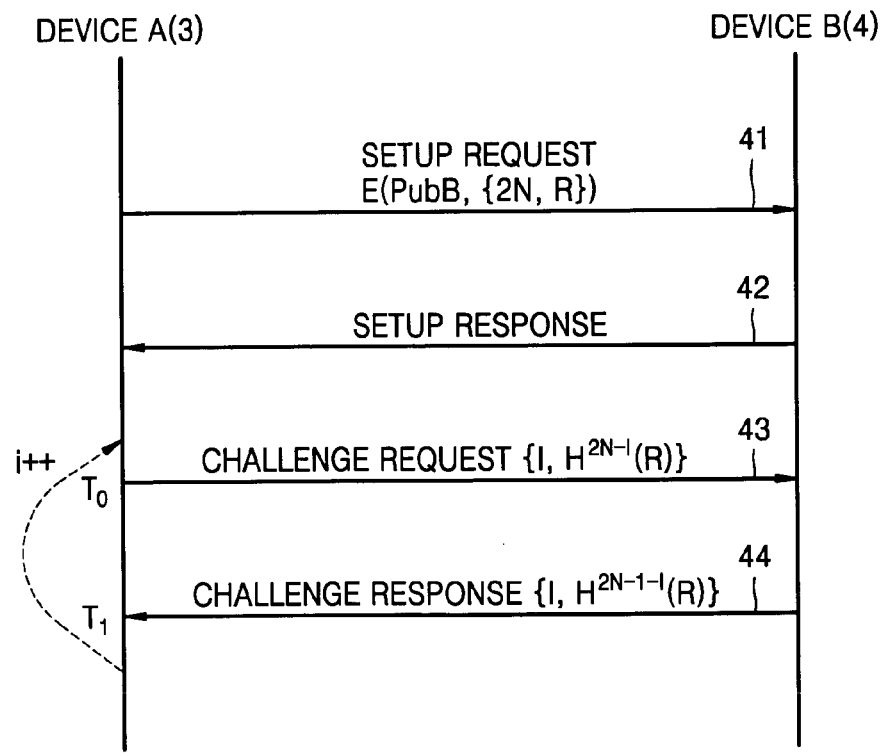

FIG. 5
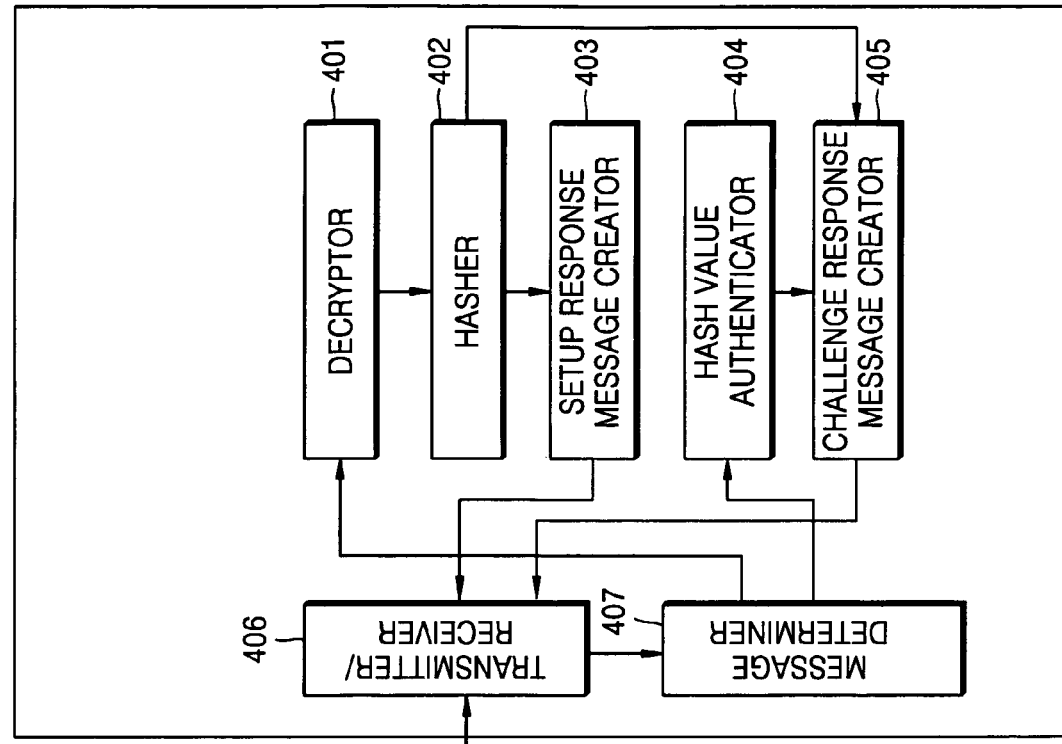
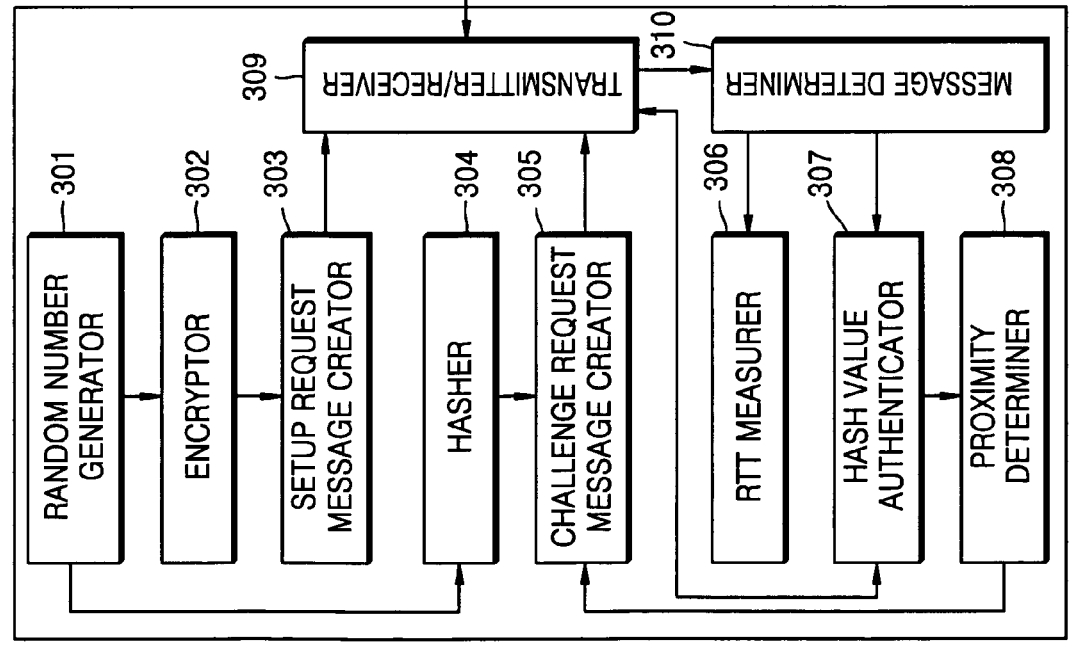

METHOD AND APPARATUS FOR CHECKING PROXIMITY BETWEEN DEVICES USING HASH CHAIN

CROSS-REFERENCE TO RELATED APPLICATIONS

This application claims priority from Korean Patent Application No. 10-2005-0036156, filed on Apr. 29, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to measuring a round trip time (RTT) between devices, and more particularly to, checking proximity between devices by measuring the RTT.

2. Description of the Related Art

FIG. 1 is a diagram illustrating a network environment to which a conventional proximity check is applied. Referring to FIG. 1, a contents provider (CP) 11 provides contents to a device A 12 that is authorized to access contents. Since an owner of the device A 12 is authorized to use the contents, the contents are only provided to devices B and C 13 and 14 owned by an authorized user. However, the contents must not allowed to a device D 15 that is not in a home network of the owner of the device A 12 but in an external network in order to prevent the contents from being illegally distributed although the device D 15 is authorized to access the contents. Therefore, the proximity between the device A 12 and other devices must be checked in advance in order to determine whether to transmit the contents from the device A 12 to other devices.

FIG. 2 is a flowchart illustrating a conventional proximity check protocol. Referring to FIG. 2, in Operation 21, a device A 1 encrypts N random number pairs $\{Ra, Rb\}_1$, $\{Ra, Rb\}_2, \ldots, \{Ra, Rb\}_N$ and the number N of the random number pairs using a public key PubB of a device B 4 and transmits a setup request message including the encrypted N random number pairs $\{Ra, Rb\}_1$, $\{Ra, Rb\}_2, \ldots, \{Ra, Rb\}_N$ and the number N of the random number pairs, i.e., E(PubB, [N, $\{Ra, Rb\}_1$, $\{Ra, Rb\}_2, \ldots, \{Ra, Rb\}_N$]), to a device B 4 in order to request the device B 4 to set up a proximity check between the device A 3 and the device B 4.

In Operation 22, the device B 4 decrypts E(PubB, [N, $\{Ra, Rb\}_1$, $\{Ra, Rb\}_2, \ldots, \{Ra, Rb\}_N$]), included in the setup request message using a private key PrivB of the device B 4, creates a setup response message indicating that the proximity check between the device A 3 and the device B 4 is completely set up, and transmits the setup response message to the device A 3.

In Operation 23, the device A 3 creates a challenge request message including a random number $\{Ra\}_1$ among N random numbers $\{Ra\}_1, \{Ra\}_2, \ldots, \{Ra\}_N$ and I=1, i.e., $\{1, \{Ra\}1\}$, and transmits the challenge request message to the device B 4 in order to challenge a successful proximity check between the device A 3 and the device B 4. Also, the device A 3 measures the time when the challenge request message is transmitted, thereby starting to measure an RTT of the device B 4.

In Operation 24, the device B 4 compares the random number $\{Ra\}_1$ included in the challenge request message with the random number $\{Ra\}_1$ corresponding to I=1 included in the challenge request message among the N random numbers $\{Ra\}_1, \{Ra\}_2, \ldots, \{Ra\}_N$. If both numbers are identical to each other, the device B 4 determines that the random number included in the challenge request message is authentic, and if both numbers are not identical to each other, determines that the random number included in the challenge request message is not authentic. If the device B 4 determines that the random number included in the challenge request message is authentic, the device B 4 creates a challenge response message including a random number $\{Rb\}_1$ corresponding to I=1 included in the challenge request message among N random numbers $\{Rb\}_1, \{Rb\}_2, \ldots, \{Rb\}_N$ and I=1, i.e., [1, $\{Rb\}_1$], and transmits the challenge response message to the device A 3.

In Operation 24, the device A 3 receives the challenge response message including [1, $\{Rb\}_1$] and measures a time when the challenge response message is received, thereby completing to measure the RTT of the device B 4. That is, the RTT is obtained by subtracting the time when the challenge request message is transmitted from the time when the challenge response message is received. Also, the device A 3 compares the random number $\{Rb\}_1$ included in the challenge response message with $\{Rb\}_1$ corresponding to I=1 included in the challenge response message among the N random numbers $\{Rb\}_1, \{Rb\}_2, \ldots, \{Rb\}_N$. If both numbers are identical to each other, the device A 3 determines that the random number included in the challenge response message is authentic. If both numbers are not identical to each other, the device A 3 determines that the random value included in the challenge response message is not authentic.

In Operation 24, if the device A 3 determines that the random value included in the challenge response message is authentic, the device A 3 compares the RTT with a proximity critical value. If the RTT is determined to be smaller than the proximity critical value, the device A 3 determines the devices A 3 and B 4 to be proximate to each other, and determines the proximity check between the devices A 3 and B 4 to be successful. If the device A 3 determines that the RTT is not smaller than the proximity critical value, the device A 3 determines that the devices A 3 and B 4 are not proximate to each other, increases I by 1, and compares I with N. If I is determined to be smaller than N, the device A 3 performs Operation 23. If I is determined not to be smaller than N, the device A 3 determines the proximity check between the devices A 3 and B 4 to be unsuccessful.

RTT is not measured once but several tens of times through several thousands of times in order to check the proximity between the devices A 3 and B 4. Even if RTT is measured once that the devices A 3 and B 4 are proximate to each other due to variability of traffic on a transmission path of a network, the devices A 3 and B 4 are considered to be proximate to each other. However, since the RTT measurement of several tens of times through several thousands of times requires encryptions and decryptions of several tens of times through several thousands of times, it is very inefficient and places considerable load on both systems of the devices A 3 and B 4.

SUMMARY OF THE INVENTION

The present invention provides a method and apparatus for checking proximity more effectively than a conventional proximity check requiring encryptions and decryptions of several tens of times through several thousands of times.

The present invention also provides a computer-readable storage medium having embodied thereon a computer program for executing the method.

According to an aspect of the present invention, there is provided a method of a method of measuring RTT, the method comprising: chain-hashing at least one random number to create a plurality of hash values; transmitting one of the created hash values to a predetermined device and starting to measure RTT of the predetermined device; and receiving from the predetermined device a response to the transmitted hash value and ending the RTT measurement.

According to another aspect of the present invention, there is provided an apparatus for measuring RTT, the apparatus comprising: a hasher chain-hashing at least one random number to create a plurality of hash values; a transmitter/receiver transmitting one of the created hash values to a predetermined device and receiving a response to the transmitted hash value from the predetermined device; and an RTT measurer measuring RTT of the predetermined device based on the time at which the hash value was transmitted and received by the transmitter/receiver.

According to another aspect of the present invention, there is provided a computer-readable storage medium having embodied thereon a computer program for executing the method of measuring RTT.

According to another aspect of the present invention, there is provided a proximity check method comprising: chain-hashing at least one random number to create a plurality of hash values; transmitting one of the created hash values to a predetermined device and starting to measure RTT of the predetermined device; receiving from the predetermined device a response to the transmitted hash value and ending the RTT measurement; and determining proximity with the predetermined device based on the measured RTT.

According to another aspect of the present invention, there is provided a proximity check apparatus comprising: a hasher chain-hashing at least one random number to create a plurality of hash values; a transmitter/receiver transmitting one of the created hash values to a predetermined device and receiving a response to the transmitted hash value from the predetermined device; an RTT measurer measuring RTT of the predetermined device based on time transmitted and received by the transmitter/receiver; and a proximity determiner determining proximity with the predetermined device based on the RTT measured by the RTT measurer.

According to another aspect of the present invention, there is provided a computer-readable storage medium having embodied thereon a computer program for executing the proximity check method.

According to another aspect of the present invention, there is provided a method of supporting an RTT measurement, the method comprising: chain-hashing at least one random number and creating a plurality of hash values; receiving a hash value corresponding to a start of the RTT measurement of a predetermined device from the predetermined device; and transmitting one of the hash values corresponding to an end of the RTT measurement in response to the received hash value.

According to another aspect of the present invention, there is provided an apparatus for supporting an RTT measurement, the apparatus comprising: a hasher chain-hashing at least one random number to create a plurality of hash values; and a transmitter/receiver receiving a hash value corresponding to a start of the RTT measurement of a predetermined device from the predetermined device, and transmitting one of the hash values corresponding to an end of the RTT measurement in response to the received hash value.

According to another aspect of the present invention, there is provided a computer-readable storage medium having embodied thereon a computer program for executing a method.

BRIEF DESCRIPTION OF THE DRAWINGS

The above and other aspects of the present invention will become more apparent by describing in detail exemplary embodiments thereof with reference to the attached drawings in which:

FIG. 3 is a flowchart illustrating a proximity check protocol according to an exemplary embodiment of the present invention;

FIG. 4 is a flowchart illustrating a proximity check protocol according to another exemplary embodiment of the present invention;

FIG. 5 is a block diagram illustrating a proximity check system according to an exemplary embodiment of the present invention;

DETAILED DESCRIPTION OF EXEMPLARY EMBODIMENTS THE INVENTION

Exemplary embodiments of the present invention will now be described with reference to the accompanying drawings.

FIG. 3 is a flowchart illustrating a proximity check protocol according to an exemplary embodiment of the present invention. The proximity check protocol uses a hash chain instead of encryption and decryption used in a conventional proximity protocol. Hashing is the transformation of a string of characters into a shorter fixed-length value key that represents the original string, and is much easier than current encryption and decryption requiring a complex operation such as an exponential operation.

Figure 1:
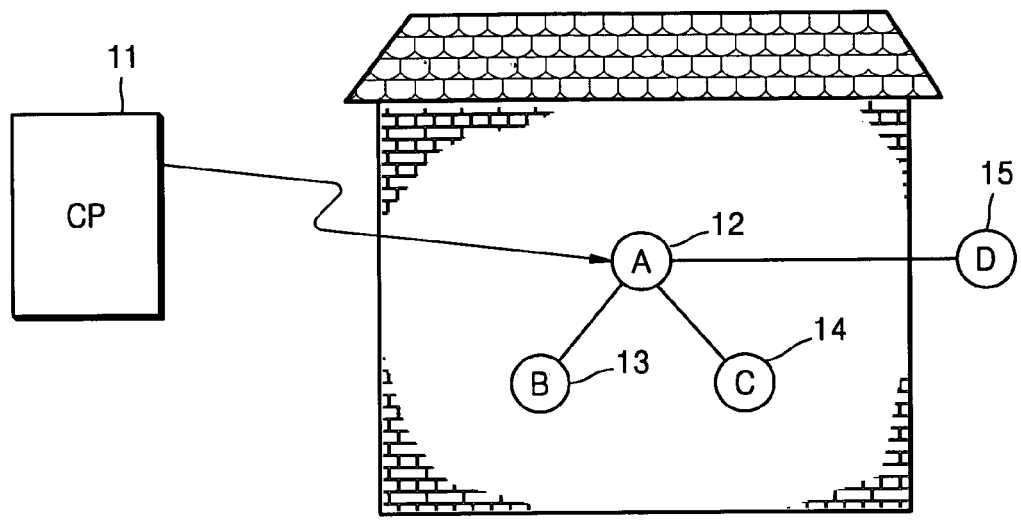
FIG. 1 is a diagram illustrating a network environment to which a conventional proximity check is applied.
Figure 2:
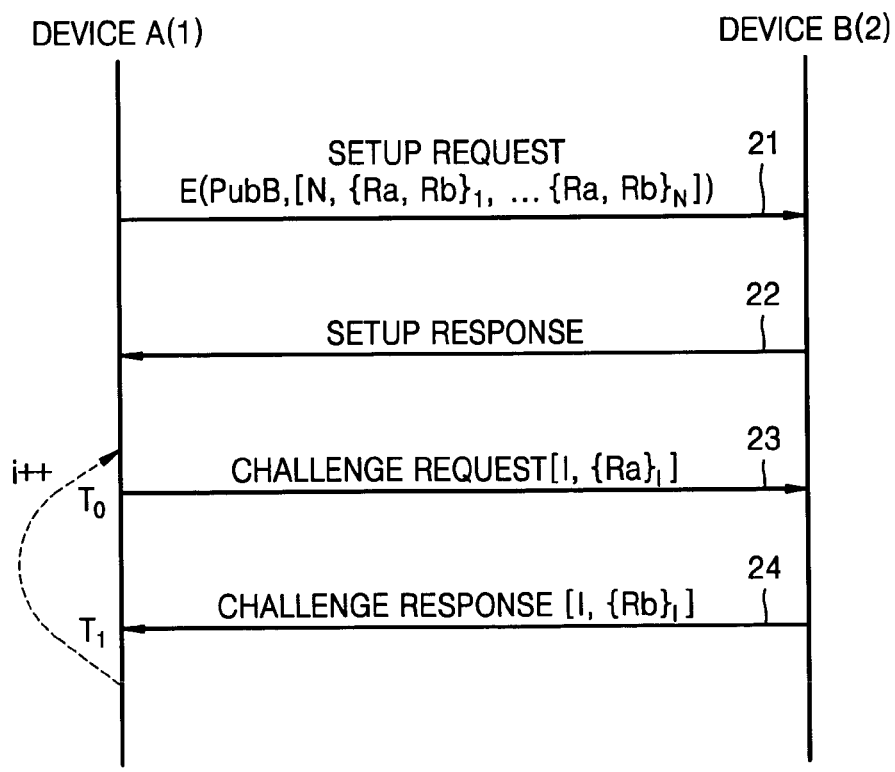
FIG. 2 is a flowchart illustrating a conventional proximity check protocol.

In Operation 31, a device A 3 encrypts random numbers Ra and Rb and hashing frequency N using a public key PubB of a device B 4 and transmits a setup request message including the encrypted random numbers Ra and Rb and hashing frequency N, i.e., E(PubB, [N, {Ra, Rb}]), to the device B 4 in order to request the device B 4 to set up a proximity check between the device A 3 and the device B 4. The device A 3 chain-hashes the random numbers Ra and Rb by the frequency N, thereby creating hash values for the random numbers Ra and Rb. The conventional proximity check protocol illustrated in FIG. 2 performs encryptions and decryptions by the frequency 2N, however, the proximity check protocol of the present exemplary embodiment performs encryptions and decryptions twice only.

In Operation 32, the device B 4 decrypts E(PubB, [N, {Ra, Rb}]) included in the setup request message using a private key PrivB of the device B 4, and chain-hashes the random numbers Ra and Rb by the frequency N, thereby creating hash values for the random numbers Ra and Rb. If the device B 4 completes hashing, the device B 4 creates a setup response message indicating that the proximity check between the device A 3 and the device B 4 is completely set up, and transmits the setup response message to the device A 3.

In Operation 33, the device A 3 creates a challenge request message including a final hash value $H^N(Ra)$ among hash values of the random number Ra, $H(Ra)$, $H^2(Ra)$, $H^3(Ra)$, ..., $H^N(Ra)$ and a hash sequence I=0, i.e., {0, $H^N(Ra)$}, and transmits the challenge request message to the device B 4 in order to challenge the successful proximity check between the device A 3 and the device B 4. Also, the device A 3 measures the time when the challenge request message is transmitted, thereby starting the measurement of the RTT of the device B 4.

The reason why the final hash value $H^N(Ra)$ is included in the first challenge request message is that since the final hash value $H^N(Ra)$ is the most hashed, it is more resistant to an outside attack than the other hash values. That is, the hash value that is resistant to the outside attack is included in the first challenge request message, thereby making the proximity check more robust.

In Operation 34, the device B 4 compares the hash value $H^N(Ra)$ included in the challenge request message with the hash value $H^N(Ra)$ corresponding to the hash sequence I=0 included in the challenge request message in the hash values of the random number Ra, $H(Ra)$, $H^2(Ra)$, $H^3(Ra)$, ..., $H^N(Ra)$. If both numbers are identical to each other, the device B 4 determines that the hash value included in the challenge request message is authentic. If both numbers are not identical to each other, the device B 4 determines that the hash value included in the challenge request message is not authentic. If the device B 4 determines that the hash value included in the challenge request message is authentic, the device B 4 creates a challenge response message including a hash value corresponding to I=0 included in the challenge request message among hash values of the random number Rb, $H(Rb)$, $H^2(Rb)$, $H^3(Rb)$, ..., $H^N(Rb)$ and I=0, i.e., {0, $H^N(Rb)$}, and transmits the challenge response message to the device A 3.

An attacker device can interrupt the proximity check. For example, the attacker device may intercept the challenge request message and transmit a fake challenge request message to the device B 4, such that the attacker device is hidden and it is assumed that the RTT of the device B 4 is properly measured. The hash value of the challenge request message is authorized to prevent interruption of the attacker device.

In Operation 34, the device A 3 receives the challenge response message including {0, $H^N(Rb)$} and measures a time when the challenge response message is received, thereby completing the measurement of the RTT of the device B 4. That is, the RTT is obtained by subtracting the time when the challenge request message is transmitted from the time when the challenge response message is received. Also, the device A 3 compares the hash value $H^N(Rb)$ included in the challenge response message with the hash value $H^N(Rb)$ corresponding to I=0 included in the challenge response message among the hash values of the random number Rb, $H(Rb)$, $H^2(Rb)$, $H^3(Rb)$, ..., $H^N(Rb)$. If both numbers are identical to each other, the device A 3 determines that the hash value included in the challenge response message is authentic. If both numbers are not identical to each other, the device A 3 determines that the hash value included in the challenge response message is not authentic.

The attacker device intercepts the challenge response message and transmits a fake challenge response message to the device A 3, such that the RTT can be fabricated. The hash value of the challenge response message is authorized to prevent interruption of the attacker device.

In Operation 34, if the device A 3 determines that the hash value included in the challenge response message is authentic, the device A 3 compares the RTT with a proximity critical value. If the RTT is determined to be smaller than the proximity critical value, the device A 3 determines the devices A 3 and B 4 to be proximate to each other, and determines the proximity check between the devices A 3 and B 4 to be successful. If the device A 3 determines that the RTT is not smaller than the proximity critical value, the device A 3 determines that the devices A 3 and B 4 are not proximate to each other, increases I by 1, and compares I with N. If I is determined to be smaller than N, the device A 3 performs Operation 33. If I is determined not to be smaller than N, the device A 3 determines that the proximity check between the devices A 3 and B 4 to be unsuccessful.

FIG. 4 is a flowchart illustrating a proximity check protocol according to another exemplary embodiment of the present invention. Referring to FIG. 4, in Operation 41, a device A 3 encrypts a random number R and hashing frequency 2N using a public key PubB of a device B 4 and transmits a setup request message including the encrypted random number R and hashing frequency 2N, i.e., E(PubB, {2N, R}), to the device B 4 in order to request the device B 4 to set up a proximity check between the device A 3 and the device B 4. The device A 3 chain-hashes the random number R by the hashing frequency 2N, thereby creating hash values for the random number R. The conventional proximity check protocol illustrated in FIG. 2 performs encryptions and decryptions by the frequency 2N, however, the proximity check protocol of the present exemplary embodiment performs encryptions and decryptions once only.

In Operation 42, the device B 4 decrypts E(PubB, {2N, R}) included in the setup request message using a private key PrivB of the device B 4, and chain-hashes the random number R by the hashing frequency 2N, thereby creating hash values for the random number R. If the device B 4 completes hashing, the device B 4 creates a setup response message indicating that the proximity check between the device A 3 and the device B 4 is completely set up, and transmits the setup response message to the device A 3.

In Operation 43, the device A 3 creates a challenge request message including a final hash value $H^{2N}(R)$ among even hash values of the random number R, $H(R)$, $H^2(R)$, $H^3(R)$, ..., $H^{2N}(R)$ and a hash sequence I=0, i.e., {0, $H^{2N}(R)$}, and transmits the challenge request message to the device B 4 in order to challenge the successful proximity check between the device A 3 and the device B 4. Also, the device A 3 measures the time when the challenge request message is transmitted, thereby starting the measurement of the RTT of the device B 4.

In Operation 44, the device B 4 compares the hash value $H^{2N}(R)$ included in the challenge request message with the hash value $H^{2N}(R)$ corresponding to I=0 included in the challenge request message among the even hash values of the random number R, $H(R)$, $H^2(R)$, $H^3(R)$, ..., $H^{2N}(R)$. If both numbers are identical to each other, the device B 4 determines that the hash value included in the challenge request message is authentic. If both numbers are not identical to each other, the device B 4 determines that the hash value included in the challenge request message is not authentic. If the device B 4 determines that the hash value included in the challenge request message is authentic, the device B 4 creates a challenge response message including a hash value $H^{2N-1}(R)$ corresponding to I=0 included in the challenge request message among odd hash values of the random number R, $H(R)$, $H^2(R)$, $H^3(R)$, ..., $H^{2N}(R)$ and I=0, i.e., {0, $H^{2N-1}(Rb)$}, and transmits the challenge response message to the device A 3.

In Operation 44, the device A 3 receives the challenge response message including {0, $H^{2N-1}(R)$} and measures the time when the challenge response message is received, thereby completing the measurement of the RTT of the device B 4. That is, the RTT is obtained by subtracting the time when the challenge request message is transmitted from the time when the challenge response message is received. Also, the device A 3 compares the hash value $H^{2N-1}(R)$ included in the challenge response message with the hash value $H^{2N-1}(R)$ corresponding to I=0 included in the challenge response message among the odd hash values of the random number R, $H(R), H^2(R), H^3(R), \ldots, H^{2N}(R)$. If both numbers are identical to each other, the device A 3 determines that the hash value included in the challenge response message is authentic. If both numbers are not identical to each other, the device A 3 determines that the hash value included in the challenge response message is not authentic.

In Operation 44, if the device A 3 determines that the hash value included in the challenge response message is authentic, the device A 3 compares the RTT with a proximity critical value. If the RTT is determined to be smaller than the proximity critical value, the device A 3 determines the devices A 3 and B 4 to be proximate to each other, and determines the proximity check between the devices A 3 and B 4 to be successful. If the device A 3 determines that the RTT is not smaller than the proximity critical value, the device A 3 determines that the devices A 3 and B 4 are not proximate to each other, increases I by 1, and compares I with N. If I is determined to be smaller than N, the device A 3 performs Operation 43. If I is determined not to be smaller than N, the device A 3 determines that the proximity check between the devices A 3 and B 4 to be unsuccessful.

Those skilled in the art to which the invention pertains can easily design the proximity check protocol that chain-hashes two or more random numbers based on the proximity check protocol illustrated in FIGS. 3 and 4.

FIG. 5 is a block diagram illustrating a proximity check system according to an exemplary embodiment of the present invention. Referring to FIG. 5, a proximity check apparatus is included in the device A 3 illustrated in FIGS. 3 and 4, and comprises a random number generator 301, an encryptor 302, a setup request message creator 303, a hasher 304, a challenge request message creator 305, an RTT measurer 306, a hash value authenticator 307, a proximity determiner 308, a transmitter/receiver 309, and a message determiner 310. A proximity check support apparatus is included in the device B 4 illustrated in FIGS. 3 and 4, and comprises a decryptor 401, a hasher 402, a setup response message creator 403, a hash value authenticator 404, a challenge response message creator 405, a transmitter/receiver 406, and a message determiner 407.

Although the devices A 3 and B 4 include the same constituent elements, the constituent elements have different functions due to a difference between the proximity check protocols illustrated in FIGS. 3 and 4.

The proximity check apparatus included in the device A 3 illustrated in FIG. 3 will now be described.

The random number generator 301 generates two random numbers Ra and Rb.

The encryptor 302 encrypts the random numbers Ra and Rb and hashing frequency N using a public key PubB of a device B 4 to create E(PubB, [N, {Ra, Rb}]). The encryptor 302 uses a public key algorithm such as Rivest Shamir Adleman (RSA) for encryption. The hashing frequency N can be determined by a user or can be stored as a default value in the device A 3 by a device designer.

The setup request message creator 303 creates a setup request message including the random numbers Ra and Rb encrypted by the encryptor 302 and the hashing frequency N, i.e., E(PubB, [N, {Ra, Rb}]), in order to request the device B 4 to set up a proximity check between the device A 3 and the device B 4.

The hasher 304 chain-hashes the random numbers Ra and Rb generated by the random number generator 301 by the frequency N, thereby creating hash values for the random numbers Ra and Rb. The hasher 304 uses a hash function such as Secure Hash Algorithm (SHA)-1 for hashing. To be more specific, the hasher 304 hashes the random number Ra to create a hash value H(Ra), and then hashes the hash value H(Ra) to create a hash value $H^2(Ra)$. The hasher 304 repeats the process by N to create hash values H(Ra), $H^2(Ra)$, $H^3(Ra)$, ..., $H^N(Ra)$. In the same manner, the hasher 304 hashes the random number Rb to create a hash value H(Rb), and then hashes the hash value H(Rb) to create a hash value $H^2(Rb)$. The hasher 304 repeats the process by N to create hash values H(Rb), $H^2(Rb)$, $H^3(Rb)$, ..., $H^N(Rb)$.

The challenge request message creator 305 creates a challenge request message including one of the hash values of the random number Ra, H(Ra), $H^2(Ra)$, $H^3(Ra)$, ..., $H^N(Ra)$ created by the hasher 304 and a hash sequence I, i.e., {I, $H^{N-1}(Ra)$} in order to challenge the successful proximity check between the device A 3 and the device B 4. To be more specific, if the message determiner 310 determines that a message received by the transmitter/receiver 309 is the setup response message indicating that the proximity check between the devices A 3 and B 4 is completely set up, the challenge request message creator 305 creates a first challenge request message including a final hash value $H^N(Ra)$ in the hash values of the random number Ra, H(Ra), $H^2(Ra)$, $H^3(Ra)$, ..., $H^N(Ra)$ created by the hasher 304 and a hash sequence I=0, i.e., {I, $H^N(Ra)$}.

In the challenge request message creator 305 receives the challenge request message from the proximity determiner 308, it creates a first challenge request message including a hash value $H^{N-1}(Ra)$ after the final hash value $H^N(Ra)$ among the hash values of the random number Ra, H(Ra), $H^2(Ra)$, $H^3(Ra)$, ..., $H^N(Ra)$ created by the hasher 304 and a hash sequence I=1, i.e., {I, $H^{N-1}(Ra)$}. In the same manner, the challenge request message creator 305 sequentially creates challenge request messages including {I, $H^{N-2}(Ra)$}, {I, $H^{N-3}(Ra)$}, ..., {I, H(Ra)}.

The RTT measurer 306 selectively measures an RTT between the devices A 3 and B 4 based on challenge request message transmitting time and challenge response message receiving time in the transmitter/receiver 309. To be more specific, the RTT measurer 306 measures the time when the challenge request message is transmitted by the transmitter/receiver 309 and the time when the challenge response message is received by the transmitter/receiver 309. The RTT measurer 306 measures the RTT from the difference between the measured time when challenge request message is transmitted and the measured time when the challenge response message is received. That is, the RTT is a value obtained by subtracting the time when the challenge request message is transmitted from the time when the challenge response message is received.

If the message determiner 310 determines that the message received by the transmitter/receiver 309 is the challenge response message including {I, $H^{N-1}(Rb)$} in response to the challenge request message transmitted by the transmitter/receiver 309, the hash value authenticator 307 authenticates the hash value included in the challenge response message. To be more specific, the hash value authenticator 307 compares the hash value $H^{N-I}(Rb)$ included in the challenge response message with the hash value $H^{N-I}(Rb)$ corresponding to the hash sequence I included in the challenge response message among the hash values of the random number Rb, H(Rb), $H^2$(Rb), $H^3$(Rb), ..., $H^N$(Rb). If both numbers are identical to each other, the hash value authenticator 307 determines that the hash value included in the challenge request message is authentic. If both numbers are not identical to each other, the hash value authenticator 307 determines that the hash value included in the challenge request message is not authentic.

The proximity determiner 308 determines whether the devices A 3 and B 4 have proximity each other according to a result obtained by the authenticating of the hash value authenticator 307 based on the RTT measured by the RTT measurer 306. To be more specific, the hash value authenticator 307 determines that the hash value included in the challenge response message is authentic, the proximity determiner 308 compares the RTT measured by the RTT measurer 306 with a proximity critical value. If the RTT is determined to be smaller than the proximity critical value, the proximity determiner 308 determines the devices A 3 and B 4 have proximity each other. If the RTT is not smaller than the proximity critical value, the proximity determiner 308 determines that the devices A 3 and B 4 do not have proximity each other, and instructs the challenge request message creator 303 to create a challenge request message until the proximity check is successful within the hashing frequency N.

The transmitter/receiver 309 transmits the setup request message created by the setup request message creator 303 or the challenge request message created by the challenge request message creator 305. The transmitter/receiver 309 receives the setup response message or the challenge response message from the device B 4 via a network.

The message determiner 310 determines whether the message received by the transmitter/receiver 309 is the setup response message or the challenge response message. To be mores specific, the message determiner 310 determines whether the message received by the transmitter/receiver 309 is the setup response message or the challenge response message according to a message type included in the message.

The proximity check support apparatus included in the device B 4 illustrated in FIG. 3 will now be described.

If the message determiner 407 determines that a message received by the transmitter/receiver 406 is a setup request message, the decryptor 401 decrypts the encrypted random numbers Ra and Rb and the hashing frequency N, i.e., E(PubB, [N, {Ra, Rb}]) included in the setup request message using a private key PrivB of the device B 4.

The hasher 402 chain-hashes the random numbers Ra and Rb decrypted by the decryptor 401 by the hashing frequency N, thereby creating hash values of the random number Ra and Rb.

If the hasher 402 completes hashing, the setup response message creator 403 creates a setup response message indicating that the proximity check between the device A 3 and the device B 4 is completely set up.

If the message determiner 407 determines that the message received by the transmitter/receiver 406 is a challenge request message including {I, $H^{N-1}$(Ra)}, the hash value authenticator 404 authenticates the hash value included in the challenge response message. To be more specific, the hash value authenticator 404 compares the hash value $H^{N-1}$(Ra) included in the challenge response message with the hash value $H^{N-1}$(Ra) corresponding to the hash sequence I included in the challenge response message among the hash values of the random number Ra, H(Ra), $H^2$(Ra), $H^3$(Ra), ..., $H^N$(Ra). If both numbers are identical to each other, the hash value authenticator 404 determines that the hash value included in the challenge request message is authentic. If both numbers are not identical to each other, the hash value authenticator 404 determines that the hash value included in the challenge request message is not authentic.

If the hash value authenticator 404 determines that the hash value included in the challenge request message is authentic, the challenge response message creator 405 creates a challenge request message including a hash value corresponding to the hash sequence I included in the challenge request message among the hash values of the random number Rb, H(Rb), $H^2$(Rb), $H^3$(Rb), ..., $H^N$(Rb) and the hash sequence I, i.e., {I, $H^{N-1}$(Rb)}. For example, if the challenge request message includes the hash value $H^N$(Ra) and I=0, the challenge response message creator 405 creates a challenge request message including $H^N$(Rb) and I=0.

The transmitter/receiver 406 transmits the setup response message created by the setup response message creator 403 or the challenge response message created by the challenge response message creator 405. The transmitter/receiver 406 receives the setup request message or the challenge request message from the device A 3 via a network.

The message determiner 407 determines whether the message received by the transmitter/receiver 406 is the setup request message or the challenge request message.

The proximity check apparatus included in the device A 3 illustrated in FIG. 4 will now be described.

The random number generator 301 generates a random number R.

The encryptor 302 encrypts the random number R generated by the random number generator 301 and hashing frequency 2N using the public key PubB of the device B 4 to create E(PubB, [N, {Ra, Rb}]). The encryptor 302 uses the public key algorithm such as RSA for encryption. The hashing frequency 2N can be determined by a user or can be stored as a default value in the device A 3 by a device designer.

The setup request message creator 303 creates a setup request message including the random number R and hashing frequency 2N encrypted by the encryptor 302, i.e., E(PubB, {2N, R}), in order to request the device B 4 to set up the proximity check between the device A 3 and the device B 4.

The hasher 304 chain-hashes the random number R generated by the random number generator 301 by the frequency 2N, thereby creating hash values for the random number R. The hasher 304 uses the hash function such as SHA-1 for hashing. To be more specific, the hasher 304 hashes the random number R to create a hash value H(R), and then hashes the hash value H(R) to create a hash value $H^2$(R). The hasher 304 repeats the process by 2N to create hash values H(R), $H^2$(R), $H^3$(R), ..., $H^{2N}$(R).

The challenge request message creator 305 creates a challenge request message including one of the even hash values of the random number R, H(R), $H^2$(R), $H^3$(Ra), ..., $H^{2N}$(R) created by the hasher 304 and the hash sequence I, i.e., {I, $H^{2N-2}$(R)} in order to challenge the successful proximity check between the device A 3 and the device B 4. To be more specific, if the message determiner 310 determines that a message received by the transmitter/receiver 309 is the setup response message indicating that the proximity check between the devices A 3 and B 4 is completely set up, the challenge request message creator 305 creates a first challenge request message including a final hash value $H^2N(R)$ among the hash values of the random number R, H(R), $H^2$(R), $H^3$(R), ..., $H^{2N}$(R) created by the hasher 304 and the hash sequence I=0, i.e., {I, $H^{2N}$(R)}.

If the challenge request message creator 305 receives the challenge request message from the proximity determiner 308, it creates a first challenge request message including a hash value $H^{2N-2}$(R) after the final hash value $H^{2N}$(R) among the even hash values of the random number R, H(R), $H^2(Ra)$, $H^4(R)$, ..., $H^{2N}(R)$ created by the hasher 304 and the hash sequence I=1, i.e., {I, $H^{2N-2}(R)$}. In the same manner, the challenge request message creator 305 sequentially creates challenge request messages including {I, $H^{2N-2}(R)$}, {I, $H^{2N-4}(R)$}, ..., {I, $H^2(R)$}.

The RTT measurer 306 selectively measures an RTT between the devices A 3 and B 4 based on the time when the challenge request message is transmitted and the time when the challenge response message is received by the transmitter/receiver 309. To be more specific, the RTT measurer 306 measures the time when the challenge request message is transmitted by the transmitter/receiver 309 and the time when the challenge response message is received by the transmitter/receiver 309. The RTT measurer 306 measures an RTT from the difference between the time when the measured challenge request message is transmitted and the time when the challenge response message is received. That is, the RTT is a value obtained by subtracting the time when the challenge request message is transmitted from the time when the challenge response message is received.

If the message determiner 310 determines that the message received by the transmitter/receiver 309 is the challenge response message including the {I, $H^{2N-1-2I}(R)$} in response to the challenge request message transmitted by the transmitter/receiver 309, the hash value authenticator 307 authenticates the hash value included in the challenge response message. To be more specific, the hash value authenticator 307 compares the hash value $H^{2N-1-2I}(R)$ included in the challenge response message with the hash value $H^{2N-1-2I}(R)$ corresponding to the hash sequence I included in the challenge response message among odd hash values of the random number R, H(R), $H^3(Rb)$, ..., $H^{2N-1-2I}(R)$. If both numbers are identical to each other, the hash value authenticator 307 determines that the hash value included in the challenge request message is authentic. If both numbers are not identical to each other, the hash value authenticator 307 determines that the hash value included in the challenge request message is not authentic.

The proximity determiner 308 selectively determines whether the devices A 3 and B 4 are proximate to each other according to a result obtained by the authenticating of the hash value authenticator 307 based on the RTT measured by the RTT measurer 306. To be more specific, the hash value authenticator 307 determines that the hash value included in the challenge response message is authentic, the proximity determiner 308 compares the RTT measured by the RTT measurer 306 with a proximity critical value. If the RTT is determined to be smaller than the proximity critical value, the hash value authenticator 307 determines the devices A 3 and B 4 have proximity each other. If the RTT is not smaller than the proximity critical value, the hash value authenticator 307 the proximity determiner 308 determines that the devices A 3 and B 4 do not have proximity each other, and instructs the challenge request message creator 303 to create a challenge request message until the proximity check is successful within the hashing frequency N.

The transmitter/receiver 309 transmits the setup request message created by the setup request message creator 303 or the challenge request message created by the challenge request message creator 305. The transmitter/receiver 309 receives the setup response message or the challenge response message from the device B 4 via a network.

The message determiner 310 determines whether the message received by the transmitter/receiver 309 is the setup response message or the challenge response message. To be more specific, the message determiner 310 determines whether the message received by the transmitter/receiver 309 is the setup response message or the challenge response message according to a message type included in the message.

The proximity check support apparatus included in the device B 4 illustrated in FIG. 5 will now be described.

If the message determiner 407 determines that a message received by the transmitter/receiver 406 is a setup request message, the decryptor 401 decrypts the encrypted random number R and the hashing frequency 2N, i.e., E(PubB, {2N, R}) included in the setup request message using the private key PrivB of the device B 4.

The hasher 402 chain-hashes the random number R decrypted by the decryptor 401 by the hashing frequency 2N, thereby creating hash values of the random number R.

When the hasher 402 has completed hashing, the setup response message creator 403 creates a setup response message indicating that the proximity check between the device A 3 and the device B 4 is completely set up.

If the message determiner 407 determines that the message received by the transmitter/receiver 406 is a challenge request message including {I, $H^{2N-2I}(R)$}, the hash value authenticator 404 authenticates the hash value included in the challenge response message. To be more specific, the hash value authenticator 404 compares the hash value $H^{2N-2I}(R)$ included in the challenge response message with the hash value $H^{2N-2I}(R)$ corresponding to the hash sequence I included in the challenge response-message among the hash values of the random number R, H(R), $H^2(R)$, $H^3(R)$, ..., $H^{2N}(R)$. If both numbers are identical to each other, the hash value authenticator 404 determines that the hash value included in the challenge request message is authentic. If both numbers are not identical to each other, the hash value authenticator 404 determines that the hash value included in the challenge request message is not authentic.

If the hash value authenticator 404 determines that the hash value included in the challenge request message is authentic, the challenge response message creator 405 creates a challenge request message including a hash value corresponding to the hash sequence I included in the challenge request message among the odd hash values of the random number R, H(R), $H^3(Rb)$, ..., $H^{2N-1}(R)$ and the hash sequence I, i.e., {I, $H^{2N-1-I}(R)$}. For example, if the challenge request message includes the hash value $H^{2N}(R)$ and I=0, the challenge response message creator 405 creates a challenge request message including $H^{2N}(R)$ and I=0.

The transmitter/receiver 406 transmits the setup response message created by the setup response message creator 403 or the challenge response message created by the challenge response message creator 405. The transmitter/receiver 406 receives the setup request message or the challenge request message from the device A 3 via a network.

The message determiner 407 determines whether the message received by the transmitter/receiver 406 is the setup request message or the challenge request message.

Figure 6:
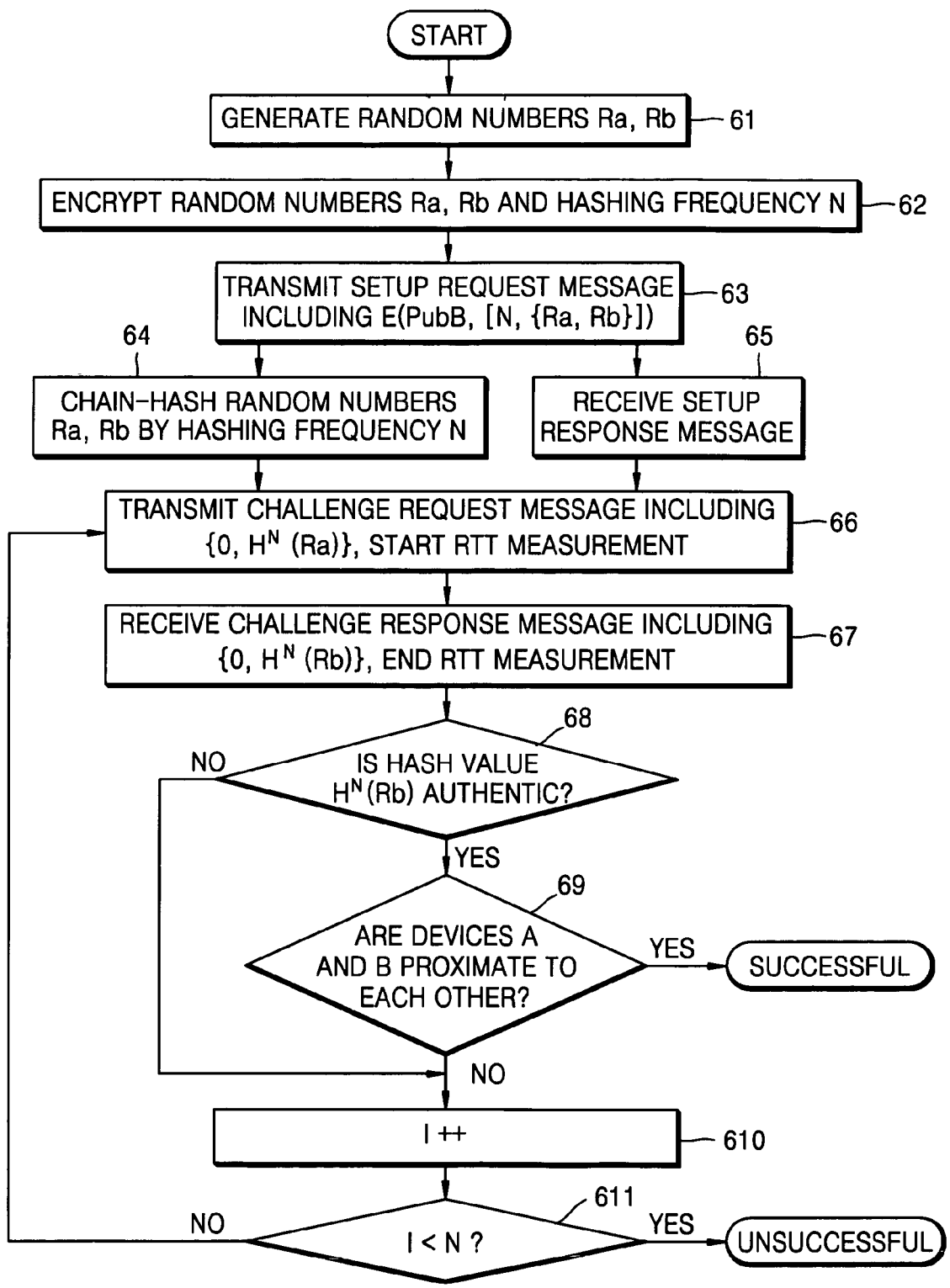
FIG. 6 is a flowchart illustrating a proximity check method according to an exemplary embodiment of the present invention.

FIG. 6 is a flowchart illustrating a proximity check method according to an exemplary embodiment of the present invention. Referring to FIG. 6, the proximity check method is processed in time series in the proximity check apparatus of the device A 3 illustrated in FIGS. 3 and 5. Therefore, the description regarding the proximity check apparatus of the device A 3 illustrated in FIGS. 3 and 5 is applied to the proximity check method.

In Operation 61, the device A 3 generates two random numbers Ra and Rb.

In Operation 62, the device A 3 encrypts the random numbers Ra and Rb resulting from Operation 61 and the hashing frequency N using the public key PubB of the device B 4 to create E(PubB, [N, {Ra, Rb}]).

In Operation 63, the device A 3 creates a setup request message including the random numbers Ra and Rb resulting from Operation 62 and the hashing frequency N, i.e., E(PubB, [N, {Ra, Rb}]), and transmits the setup request message to the device B 4 in order to request the device B 4 to set up a proximity check between the device A 3 and the device B 4.

In Operation 64, the device A 3 chain-hashes the random numbers Ra and Rb by the frequency N, thereby creating hash values for the random numbers Ra and Rb.

In Operation 65, the device A 3 receives a setup response message indicating that the proximity check between the device A 3 and the device B 4 is completely set up in response to the setup request message resulting from Operation 63.

When the device A 3 receives the setup response message, in Operation 66, the device A 3 creates a challenge request message including a final hash value $H^N(Ra)$ in hash values of the random number Ra, $H(Ra)$, $H^2(Ra)$, $H^3(Ra)$, ..., $H^N(Ra)$ resulting from Operation 64 and a hash sequence I=0, i.e., $\{0, H^N(Ra)\}$, and transmits the challenge request message to the device B 4 in order to challenge the successful proximity check between the device A 3 and the device B 4. Also, the device A 3 measures the time when the challenge request message is transmitted, thereby starting the measurement of the RTT of the device B 4.

In Operation 67, the device A 3 receives a challenge response message including $\{0, H^N(Rb)\}$ in response to the challenge request message resulting from Operation 66, and measures the time when the challenge response message is received, thereby completing the measurement of the RTT of the device B 4. That is, the RTT is obtained by subtracting the time when the challenge request message is transmitted from the time when the challenge response message is received.

In Operation 68, the device A 3 authenticates the hash value included in the challenge response message resulting from Operation 67. To be more specific, the device A 3 compares the hash value $H^N(Rb)$ included in the challenge response message with the hash value $H^N(Rb)$ corresponding to I=0 included in the challenge response message among the hash values of the random number Rb, $H(Rb)$, $H^2(Rb)$, $H^3(Rb)$, ..., $H^N(Rb)$. If both numbers are identical to each other, the device A 3 determines that the hash value included in the challenge response message is authentic. If both numbers are not identical to each other, the device A 3 determines that the hash value included in the challenge response message is not authentic.

If the device A 3 determines that the hash value included in the challenge response message is authentic in Operation 68, in Operation 69, the device A 3 determines whether the devices A 3 and B 4 are proximate to each other based on the measured RTT resulting from Operations 65 and 66. To be more specific, the device A 3 compares the measured RTT with a proximity critical value. If the RTT is determined to be smaller than the proximity critical value, the device A 3 determines the devices A 3 and B 4 to be proximate to each other, and determines the proximity check between the devices A 3 and B 4 to be successful. If the device A 3 determines that the RTT is not smaller than the proximity critical value, the device A 3 determines that the devices A 3 and B 4 are not proximate to each other.

If the device A 3 determines that the hash value included in the challenge response message is not authentic in Operation 68, or if the device A 3 determines that the devices A 3 and B 4 are not proximate to each other in Operation 69, in Operation 610, the device A 3 increases I by 1.

In Operation 611, the device A 3 compares increased I with N. If I is determined to be smaller than N, the device A 3 performs Operation 66. If I is determined not to be smaller than N, the device A 3 determines that the proximity check between the devices A 3 and B 4 to be unsuccessful.

Figure 7:
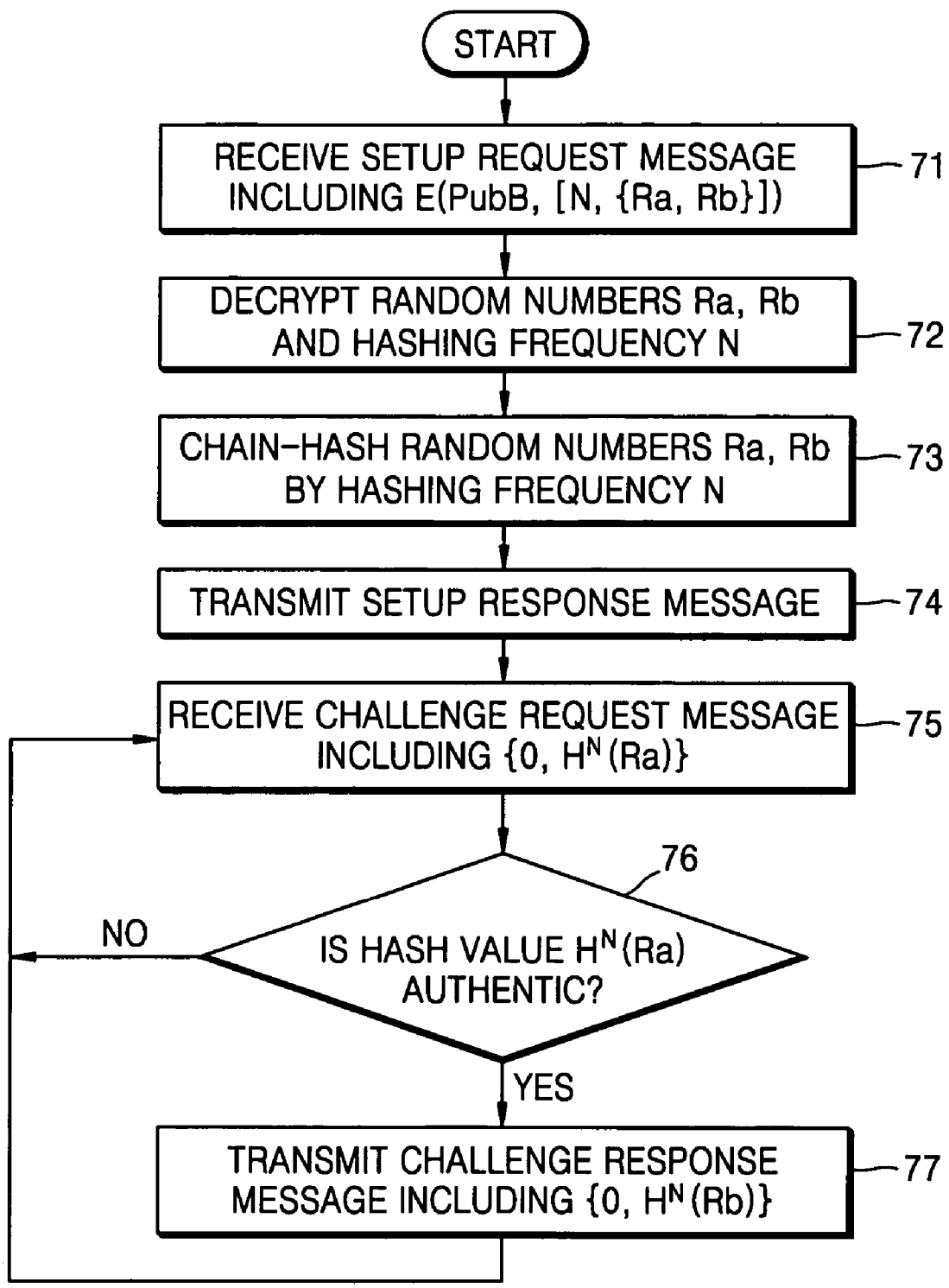
FIG. 7 is a flowchart illustrating a proximity check support method according to an exemplary embodiment of the present invention.

FIG. 7 is a flowchart illustrating a proximity check support method according to an exemplary embodiment of the present invention. Referring to FIG. 7, the proximity check support method is processed in time series in the proximity check support apparatus of the device B 4 illustrated in FIGS. 3 and 5. Therefore, the description regarding the proximity check support apparatus of the device B 4 illustrated in FIGS. 3 and 5 is applied to the proximity check support method.

In Operation 71, the device B 4 receives a setup request message including the encrypted random numbers Ra and Rb and the hashing frequency N, i.e., E(PubB, [N, {Ra, Rb}]), from the device A 3.

In Operation 72, the device B 4 decrypts the random numbers Ra and Rb and the hashing frequency N, i.e., E(PubB, [N, {Ra, Rb}]) included in the setup request message resulting from Operation 71 using the private key PrivB of the device B 4.

In Operation 73, the device B 4 chain-hashes the decrypted random numbers Ra and Rb resulting from Operation 72 by the hashing frequency N, thereby creating hash values of the random number Ra and Rb.

In Operation 74, if hashing is completed in Operation 73, the device B 4 creates a setup response message indicating that the proximity check between the device A 3 and the device B 4 is completely set up and transmits the setup response message to the device A 3.

In Operation 75, the device B 4 receives a challenge request message including $\{0, H^N(Ra)\}$ from the device A 3 that receives the setup response message resulting from Operation 74.

In Operation 76, the device B 4 authenticates the hash value included in the challenge request message resulting from Operation 75. To be more specific, the device B 4 compares the hash value $H^N(Ra)$ included in the challenge request message with the hash value $H^N(Ra)$ corresponding to the hash sequence I=0 included in the challenge request message among the hash values of the random number Ra, $H(Ra)$, $H^2(Ra)$, $H^3(Ra)$, ..., $H^N(Ra)$. If both numbers are identical to each other, the device B 4 determines that the hash value included in the challenge request message is authentic. If both numbers are not identical to each other, the device B 4 determines that the hash value included in the challenge request message is not authentic and performs Operation 75.

If the device B 4 determines that the hash value included in the challenge request message is authentic in Operation 76, in Operation 77, the device B 4 creates a challenge response message including a hash value corresponding to the hash sequence I=0 included in the challenge request message among the hash values of the random number Rb, $H(Rb)$, $H^2(Rb)$, $H^3(Rb)$, ..., $H^N(Rb)$ and the hash sequence I, i.e., $\{0, H^N(Rb)\}$, transmits the challenge response message to the device A 3, and performs Operation 75.

Figure 8:
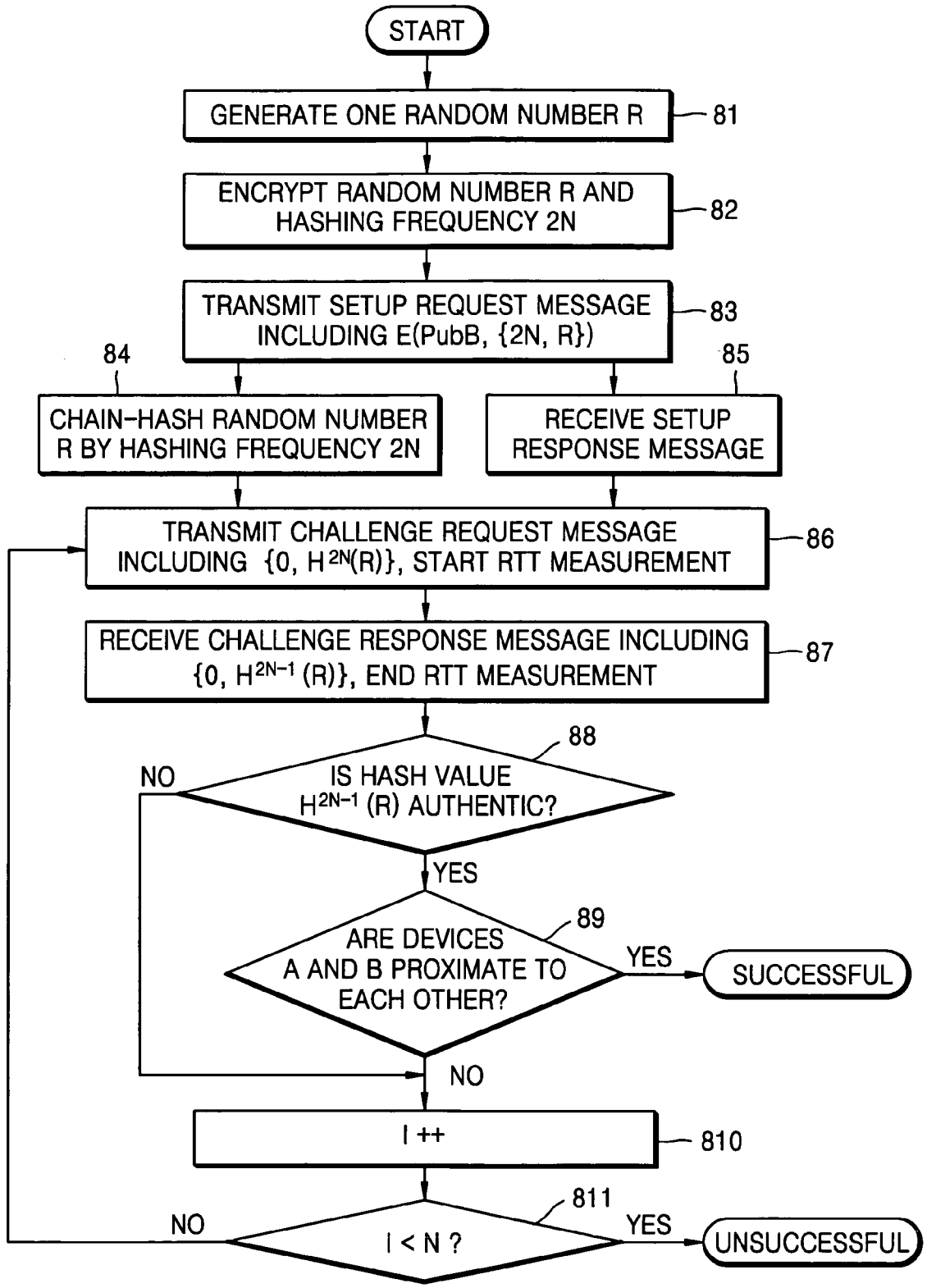
FIG. 8 is a flowchart illustrating a proximity check method according to another exemplary embodiment of the present invention.

FIG. 8 is a flowchart illustrating a proximity check method according to another exemplary embodiment of the present invention. Referring to FIG. 8, the proximity check method is processed in time series in the proximity check apparatus of the device A 3 illustrated in FIGS. 4 and 5. Therefore, the description regarding the proximity check apparatus of the device A 3 illustrated in FIGS. 4 and 5 is applied to the proximity check method.

In Operation 81, the device A 3 generates a random number R.

In Operation 82, the device A 3 encrypts the random number R resulting from Operation 81 and hashing frequency 2N using a public key PubB of the device B 4 and creates E(PubB, {2N, R}).

In Operation 83, the device A 3 creates a setup request message including the encrypted random number R resulting from Operation 82 and the hashing frequency N, i.e., E(PubB, {2N, R}), and transmits the setup request message to the device B 4 in order to request the device B 4 to set up a proximity check between the device A 3 and the device B 4.

In Operation 84, the device A 3 chain-hashes the random number R by the frequency 2N, thereby creating hash values for the random number R.

In Operation 85, the device A 3 receives a setup response message indicating that the proximity check between the device A 3 and the device B 4 is completely set up in response to the setup request message resulting from Operation 83.

When the device A 3 receives the setup response message, in Operation 86, the device A 3 creates a challenge request message including $H^{2N}(R)$ in even hash values of the random number R, $H(R)$, $H^2(R)$, $H^4(R)$, ..., $H^{2N}(R)$ resulting from Operation 84 and a hash sequence I=0, i.e., $\{0, H^{2N}(R)\}$, and transmits the challenge request message to the device B 4 in order to challenge the successful proximity check between the device A 3 and the device B 4. Also, the device A 3 measures time when transmitted the challenge request message, thereby starting to measure the RTT of the device B 4.

In Operation 87, the device A 3 receives a challenge response message including $\{0, H^{2N-1}(R)\}$ in response to the challenge request message resulting from Operation 86, and measures the time when the challenge response message is received, thereby completing the measurement of the RTT of the device B 4. That is, the RTT is obtained by subtracting the time when the challenge request message is transmitted from the time when the challenge response message is received.

In Operation 88, the device A 3 authenticates the hash value included in the challenge response message resulting from Operation 87. To be more specific, the device A 3 compares the hash value $H^{2N-1}(R)$ included in the challenge response message with the hash value $H^{2N-1}(R)$ corresponding to I=0 included in the challenge response message in the odd hash values of the random number R, $H(R)$, $H^3(R)$, ..., $H^{2N-1}(R)$. If both numbers are identical to each other, the device A 3 determines that the hash value included in the challenge response message is authentic. If both numbers are not identical to each other, the device A 3 determines that the hash value included in the challenge response message is not authentic.

If the device A 3 determines that the hash value included in the challenge response message is authentic in Operation 88, in Operation 69, the device A 3 determines whether the devices A 3 and B 4 have proximity to each other based on the measured RTT resulting from Operations 85 and 86. To be more specific, the device A 3 compares the measured RTT with a proximity critical value. If the measured RTT is determined to be smaller than the proximity critical value, the device A 3 determines the devices A 3 and B 4 to be proximate to each other, and determines the proximity check between the devices A 3 and B 4 to be successful. If the device A 3 determines that the measured RTT is not smaller than the proximity critical value, the device A 3 determines that the devices A 3 and B 4 are not proximate to each other.

If the device A 3 determines that the hash value included in the challenge response message is not authentic in Operation 88, or if the device A 3 determines that the devices A 3 and B 4 are not proximate to each other in Operation 89, in Operation 810, the device A 3 increases I by 1.

In Operation 811, the device A 3 compares increased I with N. If I is determined to be smaller than N, the device A 3 performs Operation 86. If I is determined not to be smaller than N, the device A 3 determines that the proximity check between the devices A 3 and B 4 to be unsuccessful.

Figure 9:
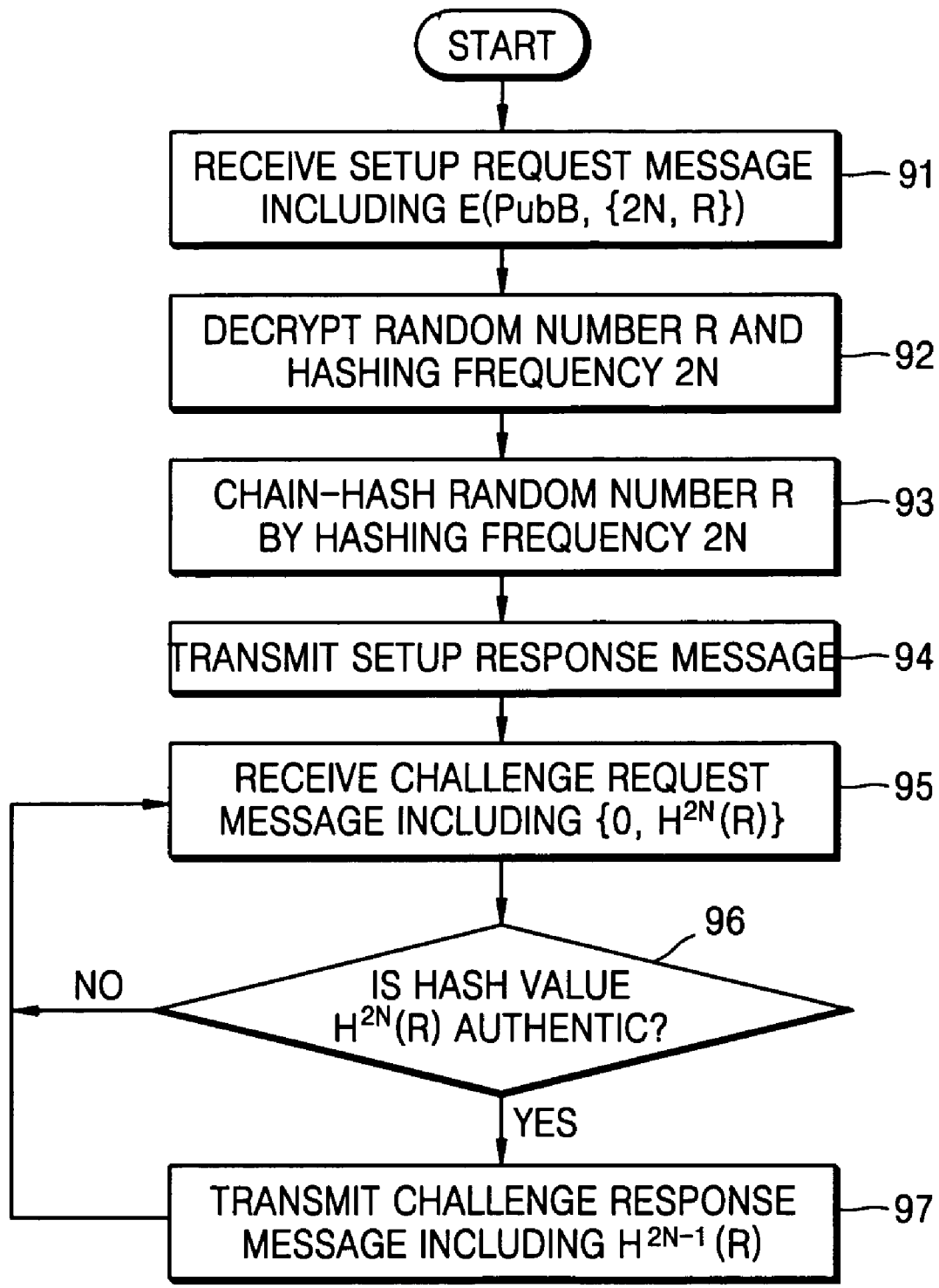
FIG. 9 is a flowchart illustrating a proximity check support method according to another exemplary embodiment of the present invention.

FIG. 9 is a flowchart illustrating a proximity check support method according to another exemplary embodiment of the present invention. Referring to FIG. 9, the proximity check support method is processed in time series in the proximity check support apparatus of the device B 4 illustrated in FIGS. 4 and 5. Therefore, the description regarding the proximity check support apparatus of the device B 4 illustrated in FIGS. 4 and 5 is applied to the proximity check support method.

In Operation 91, the device B 4 receives a setup request message including the random number R and the hashing frequency 2N, i.e., E(PubB, {2N, R}), from the device A 3.

In Operation 92, the device B 4 decrypts the random number R and the hashing frequency 2N, i.e., E(PubB, {2N, R}) included in the setup request message resulting from Operation 91 using the private key PrivB of the device B 4.

In Operation 93, the device B 4 chain-hashes the decrypted random number R resulting from Operation 92 by the hashing frequency N, thereby creating hash values of the random number R.

In Operation 94, if hashing is completed in Operation 93, the device B 4 creates a setup response message indicating that the proximity check between the device A 3 and the device B 4 is completely set up and transmits the setup response message to the device A 3.

In Operation 95, the device B 4 receives a challenge request message including $\{0, H^{2N}(R)\}$ from the device A 3 that receives the setup response message resulting from Operation 94.

In Operation 96, the device B 4 authenticates the hash value included in the challenge request message resulting from Operation 95. To be more specific, the device B 4 compares the hash value $H^{2N}(R)$ included in the challenge request message with the hash value $H^{2N}(R)$ corresponding to the hash sequence I=0 included in the challenge request message among the even hash values of the random number R, $H^2(R)$, $H^4(R)$, ..., $H^{2N}(R)$. If both numbers are identical to each other, the device B 4 determines that the hash value included in the challenge request message is authentic. If both numbers are not identical to each other, the device B 4 determines that the hash value included in the challenge request message is not authentic and performs Operation 95.

If the device B 4 determines that the hash value included in the challenge request message is authentic in Operation 96, in Operation 97, the device B 4 creates a challenge response message including $H^{2N-1}(R)$ corresponding to the hash sequence I=0 included in the challenge request message among the odd hash values of the random number R, $H(R)$, $H^3(R)$, ..., $H^{2N-1}(R)$ and the hash sequence I=0, i.e., $\{0, H^{2N-1}(R)\}$, transmits the challenge response message to the device A 3, and performs Operation 95.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves.

The present invention measures RTT several tens of times through several thousands of times using a hash chain, thereby performing a more effective proximity check than a conventional proximity check requiring encryptions and decryptions of several tens of times through several thousands of times. The present invention also creates a first challenge request message including a final hash value that is resistant to an outside attack, thereby performing a robust proximity check.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of measuring a round trip time (RTT), the method comprising:
   (a) chain-hashing at least one random number to create a plurality of hash values;
   (b) transmitting one of the created hash values to a device and starting a measurement of the RTT of the device; and
   (c) receiving from the device a response to the transmitted hash value and ending the measurement of the RTT.

2. The method of claim 1, wherein, in operation (b), a final hash value among the created hash values is transmitted first.

3. The method of claim 1, wherein, in operation (a), the at least one random number is chain-hashed by a predetermined frequency, and
   wherein operations (b) and (c) are repeated by the predetermined frequency.

4. The method of claim 1, further comprising encrypting at least one random number,
   wherein, in operation (b), the encrypted random number is transmitted to the device.

5. The method of claim 1, wherein, in operation (a), first and second random numbers are chain-hashed to create hash values of the first and second random numbers,
   wherein, in operation (b), one of the hash values of the first random number is transmitted, and
   wherein, in operation (c), one of the hash values of the second random number is received in response to the transmitted hash value.

6. The method of claim 1, wherein, in operation (a), a random number is chain-hashed to increase a plurality of hash values,
   wherein, in operation (b), one of the hash values of the random number is transmitted, and
   wherein, in operation (c), another one of the hash values of the random number is received in response to the transmitted hash value.

7. An apparatus for measuring a round trip time (RTT), the apparatus comprising:
   a hasher which chain-hashes at least one random number to create a plurality of hash values;
   a transmission and reception unit which transmits one of the created hash values to a device and receives a response to the transmitted hash value from the device; and
   an RTT measurer which measures an RTT of the device based on a time when the hash value was transmitted and a time which the response was received by the transmission and reception unit.

8. A non-transitory computer-readable storage medium having embodied thereon a computer program for executing a method of measuring a round trip time (RTT), the method comprising:
   chain-hashing at least one random number to create a plurality of hash values;
   transmitting one of the created hash values to a device and starting a measurement of an RTT of the device; and
   receiving from the device a response to the transmitted hash value and ending the measurement of the RTT.

9. A proximity check method comprising:
   (a) chain-hashing at least one random number to create a plurality of hash values;
   (b) transmitting one of the created hash values to a device and starting a measurement of a round trip time (RTT) of the device;
   (c) receiving from the device a response to the transmitted hash value and ending the measurement of the RTT; and
   (d) determining a proximity with the device based on the measured RTT.

10. The proximity check method of claim 9, further comprising authenticating the hash value included in the response,
    wherein operation (d) comprises selectively determining the proximity according to a result obtained by the authenticating.

11. A proximity check apparatus comprising:
    a hasher which chain-hashes at least one random number to create a plurality of hash values;
    a transmission and reception unit which transmits one of the created hash values to a device and receives a response to the transmitted hash value from the device;
    a round trip time (RTT) measurer which measures an RTT of the device based on a time transmitted when the hash value was transmitted and a time which the response was received by the transmission and reception unit; and
    a proximity determiner which determines a proximity with the device based on the RTT measured by the RTT measurer.

12. A non-transitory computer-readable storage medium having embodied thereon a computer program for executing a proximity check method, the proximity check method comprising:
    (a) chain-hashing at least one random number to create a plurality of hash values;
    (b) transmitting one of the created hash values to a device and starting a measurement of a round trip time (RTT) of the device;
    (c) receiving from the device a response to the transmitted hash value and ending the measurement of the RTT; and
    (d) determining a proximity with the device based on the RTT.

13. A method of supporting a round trip time (RTT) measurement, the method comprising:
    (a) chain-hashing at least one random number and creating a plurality of hash values,
    (b) receiving from a device a hash value corresponding to a start of an RTT measurement of the device; and
    (c) transmitting one of the hash values corresponding to an end of the RTT measurement in response to the received hash value.

14. The method of claim 13, wherein, in operation (c), a final hash value among the created hash values is first transmitted.

15. The method of claim 13, further comprising decrypting encrypted random numbers,
    wherein, in operation (b), the decrypted random numbers are chain-hashed.

16. The method of claim 13, further comprising authenticating the received hash value,
    wherein, in operation (c), the hash value is selectively transmitted according to a result obtained by the authenticating.

17. The method of claim 13, wherein, in operation (a), the random numbers are chain-hashed by a predetermined frequency, and
wherein operations (b) and (c) are repeated by the predetermined frequency.

18. An apparatus for supporting a round trip time (RTT) measurement, the apparatus comprising:
a hasher which chain-hashes at least one random number to create a plurality of hash values; and
a transmission and reception unit which receives from a predetermined device a hash value corresponding to a start of an RTT measurement of the device, and transmits one of the hash values corresponding to an end of the RTT measurement in response to the received hash value.

19. A non-transitory computer-readable storage medium having embodied thereon a computer program for executing a method of supporting a round trip time (RTT) measurement, the method comprising:
chain-hashing at least one random number and creating a plurality of hash values,
receiving from a device a hash value corresponding to a start of an RTT measurement of the device; and
transmitting one of the hash values corresponding to an end of the RTT measurement in response to the received hash value.

* * * * *